US010255885B2

(12) United States Patent
Hansen

(10) Patent No.: US 10,255,885 B2
(45) Date of Patent: Apr. 9, 2019

(54) PARTICIPANT SELECTION BIAS FOR A VIDEO CONFERENCING DISPLAY LAYOUT BASED ON GAZE TRACKING

(71) Applicant: CISCO TECHNOLOGY, INC., San Jose, CA (US)

(72) Inventor: Robert A. Hansen, Rickmansworth (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/258,600

(22) Filed: Sep. 7, 2016

(65) Prior Publication Data

US 2018/0070050 A1 Mar. 8, 2018

(51) Int. Cl.
| | |
|---|---|
| *H04N 7/14* | (2006.01) |
| *G09G 5/14* | (2006.01) |
| *G06F 3/01* | (2006.01) |
| *H04N 7/15* | (2006.01) |
| *G09G 5/00* | (2006.01) |

(52) U.S. Cl.
CPC ............ *G09G 5/14* (2013.01); *G06F 3/013* (2013.01); *G09G 5/00* (2013.01); *H04N 7/147* (2013.01); *H04N 7/152* (2013.01); *G09G 2320/08* (2013.01); *G09G 2320/10* (2013.01); *G09G 2354/00* (2013.01)

(58) Field of Classification Search
None
See application file for complete search history.

(56) References Cited

U.S. PATENT DOCUMENTS

| | | |
|---|---|---|
| 2007/0160076 A1 | 7/2007 | Faber et al. |
| 2008/0207190 A1 | 8/2008 | Altberg et al. |
| 2010/0034367 A1 | 2/2010 | Das et al. |
| 2010/0220897 A1* | 9/2010 | Ueno ............... G06K 9/00208 382/115 |

(Continued)

OTHER PUBLICATIONS

Slovak, Petr, et al., "GColl: A Flexible Videoconferencing Environment for Group-to-Group Interaction," Interact 2009, 12th IFIP TC13 International Conference on Human-Computer, Uppsala, Aug. 24-28, 2009; 4 pages.

(Continued)

*Primary Examiner* — Maria El-Zoobi

(57) ABSTRACT

A method is disclosed and in one embodiment includes presenting to a user a display layout associated with a video conferencing session, the display layout comprising a plurality of images of participants in the video conferencing session, wherein each of the participants is assigned to a layout category; accumulating gaze tracking information indicative of an amount of time the user has spent looking at the image of a first one of the participants relative to the images of other ones of the participants; assigning a measure of interest ("MOI") to the first one of the participants based on the accumulated gaze tracking information; determining whether the assigned MOI meets a first threshold value; if the assigned MOI meets the first threshold value, updating the layout category to which the first one of the participants is assigned; and updating the display layout using the updated layout category to which the first one of the participants is assigned.

20 Claims, 7 Drawing Sheets

(56) References Cited

U.S. PATENT DOCUMENTS

| | | | | |
|---|---|---|---|---|
| 2010/0315482 | A1* | 12/2010 | Rosenfeld | H04N 7/147 348/14.08 |
| 2012/0050454 | A1* | 3/2012 | Eisenberg | H04N 7/152 348/14.09 |
| 2013/0076853 | A1* | 3/2013 | Diao | H04N 7/15 348/14.08 |
| 2013/0110570 | A1 | 5/2013 | Ament | |
| 2013/0120522 | A1* | 5/2013 | Lian | H04N 7/15 348/14.08 |
| 2013/0194177 | A1* | 8/2013 | Sakata | H04N 21/4223 345/156 |
| 2013/0243177 | A1 | 9/2013 | Altberg et al. | |
| 2014/0160340 | A1* | 6/2014 | Farnand | H04N 5/23219 348/333.11 |
| 2014/0267576 | A1* | 9/2014 | Hiller | H04N 7/152 348/14.09 |
| 2016/0050391 | A1* | 2/2016 | Schultz | H04N 7/144 348/14.07 |
| 2016/0065735 | A1 | 3/2016 | Pott et al. | |

OTHER PUBLICATIONS

Vertegaal, Roel, et al., "GAZE-2: Conveying Eye Contact in Group Video Conferencing Using Eye-Controlled Camera Direction," CHI '03, SIGCHI Conference on Human Factors in Computing Systems, Apr. 5-10, 2003; 8 pages.

* cited by examiner

PARTICIPANT SELECTION BIAS FOR A VIDEO CONFERENCING DISPLAY LAYOUT BASED ON GAZE TRACKING

TECHNICAL FIELD

The present disclosure relates generally to network systems and, more particularly, to participant selection bias in the display layout of a video conferencing session based on participant gaze tracking in such systems.

BACKGROUND

Electronic communications such as emails chats, online conferences, videoconferences, voice over Internet protocol (VoIP) are an integral part of productivity in the modern workforce. In the case of online conferences, users are often provided with video data associated with the meeting. Some online conference systems enable users to participate in an audio portion of the meeting by calling a conference number.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

A method is disclosed and in one embodiment includes presenting to a user a display layout associated with a video conferencing session, the display layout comprising a plurality of images of participants in the video conferencing session, wherein each of the participants is assigned to a layout category; accumulating gaze tracking information indicative of an amount of time the user has spent looking at the image of a first one of the participants relative to the images of other ones of the participants; assigning a measure of interest ("MOI") to the first one of the participants based on the accumulated gaze tracking information; determining whether the assigned MOI meets a first threshold value; if the assigned MOI meets the first threshold value, updating the layout category to which the first one of the participants is assigned; and updating the display layout using the updated layout category to which the first one of the participants is assigned.

Example Embodiments

While the number of participants that may participate in a video conference may be arbitrarily large, there is a practical limit on how many of those participants a particular user's display layout will accommodate. This is due to the necessity of using increasingly small panes, as well as the bandwidth and CPU cost of displaying a large number of participants simultaneously. As a result, video conferencing layouts in conferences with large numbers of users will generally only display a subset of participants to any given user, often in a grid or "film strip" type layout. Embodiments described herein address manners in which the subset may be selected and displayed in a fashion that is seamless and natural to the user.

Many Multipoint Conferencing Units ("MCUs,") such as Cisco's Telepresence™ Server, allow an administrator to designate a participant as a chair or identify a particular participant as "important" such that the MCU may ensure that the person so designated/identified participant is always included in in all users' display locations for the video conference. Some video conferencing systems, such as WebEx™, permit a user to select one or more participants they wish to view, e.g., by "pinning" those participants, thereby ensuring those participants are always visible on the user's display.

Embodiments herein use gaze tracking of a user viewing a multi-participant layout display for a video conferencing session to determine which participant(s) the user is most interested in viewing and biasing selection of a subset of participants for display in the layout so that the user views the participants in which they are most interested without any manual intervention or even conscious selection on the part of the user.

Figure 1:
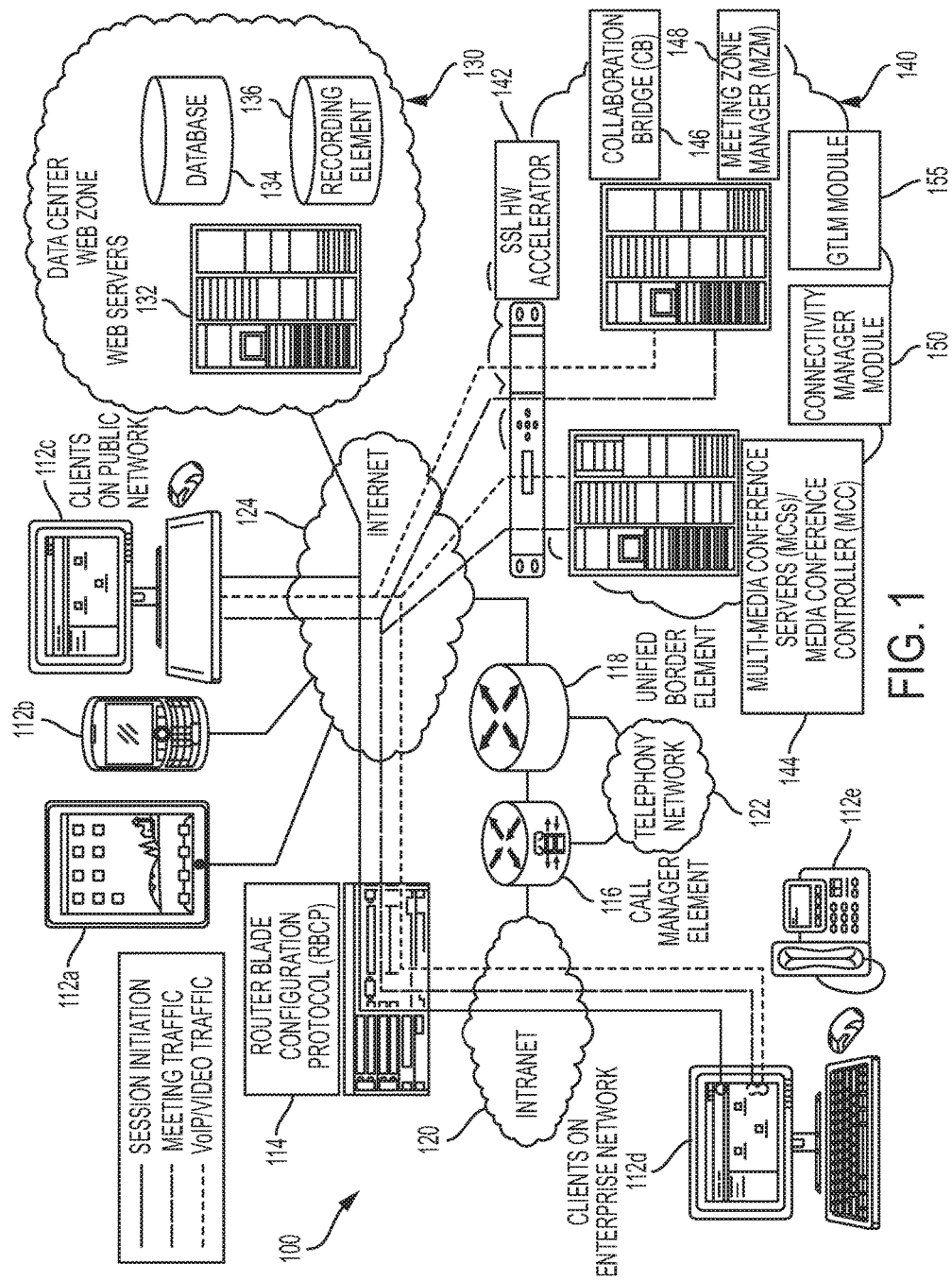
FIG. 1 is a simplified schematic diagram of a communication system in which participant selection bias for a video conferencing display layout based on gaze tracking may be implemented in accordance with one embodiment of the present disclosure.

FIG. 1 is a simplified block diagram illustrating a communication system 100 in which participant selection bias for a video conferencing display layout based on gaze tracking may be implemented in accordance with embodiments described herein. In specific implementations, communication system 100 can be provisioned for use in generating, managing, hosting, and/or otherwise providing virtual meetings. In certain scenarios (many of which are detailed below), communication system 100 may be configured for retrieving dynamically assigned numerical identifiers for an endpoint for use in a meeting session. The architecture of communication system 100 is applicable to any type of conferencing or meeting technology such as video conferencing architectures (e.g., Telepresence™), web cam configurations, smartphone deployments, personal computing applications (e.g., Skype™) multimedia meeting platforms (e.g., MeetingPlace™, WebEx™, other virtual meeting client, etc.), desktop applications, or any other suitable environment in which video data is sought to be managed.

Communication system 100 may include any number of endpoints 112a-e that can achieve suitable network connectivity via various points of attachment. In this particular example, communication system 100 can include an Intranet 120, a telephony network 122, and an Internet 124, which (in this particular example) offers a pathway to a data center web zone 130 and a data center meeting zone 140. Telephony network 122 may include, among other things, a voice over Internet protocol (VoIP) gateway and a public switched telephone network (PSTN).

Data center web zone 130 includes a plurality of web servers 132, a database 134, and a recording element 136. Data center meeting zone 140 includes a secure sockets layer hardware (SSL HW) accelerator 142, a plurality of multimedia conference servers (MCSs)/media conference controller (MCC), which may comprise an MCU, 144, a collaboration bridge 146, a meeting zone manager 148, a connectivity manager module 150, and a gaze tracking and layout manager ("GTLM") module 155. As a general proposition, each MCS/MCU can be configured to coordinate video and voice traffic for a given online meeting. Additionally, each MCC can be configured to manage the MCS/MCU from data center meeting zone 140. Each of endpoints 112*a*-*e* can be provisioned with one or more virtual meeting applications. A virtual meeting application may comprise one or more of, e.g., a virtual meeting client, a connectivity manager module, and a GTLM module (operably coupled to one another). A virtual meeting client is operable (e.g., by an endpoint) to establish a connection to a virtual meeting session. The connectivity manager module is operable to facilitate connections and data transfer with between endpoints.

Note that various types of routers and switches can be used to facilitate communications amongst any of the elements of FIG. 1. For example, a call manager element 116 and a unified border element 118 can be provisioned between telephony network 122 and Intranet 120. The call manager element is a network manager for IP phones. Also depicted in FIG. 1 are a number of pathways (e.g., shown as solid or broken lines) between the elements for propagating meeting traffic, session initiation, and voice over Internet protocol (VoIP)/video traffic.

Figure 2:
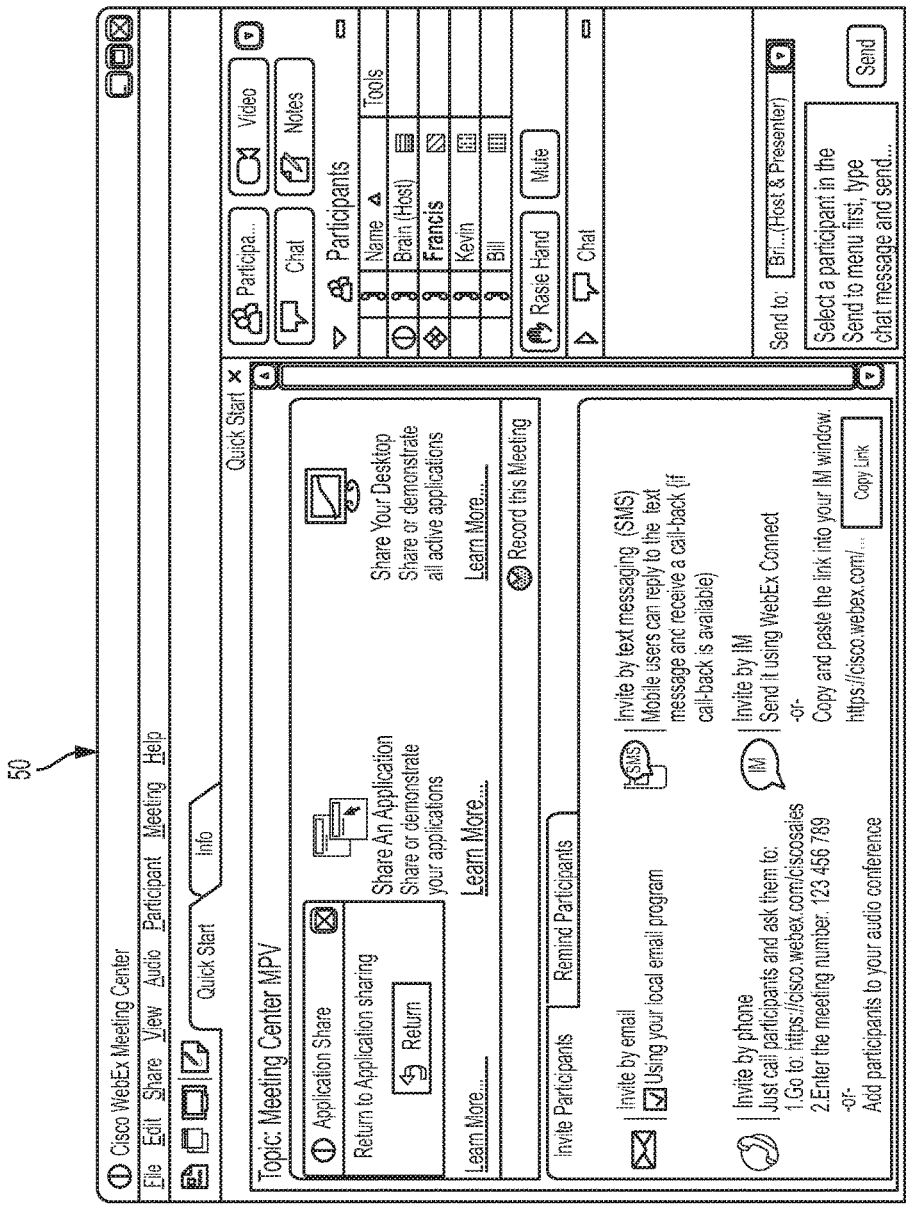
FIG. 2 is simplified diagram illustrating exemplary logic according to an embodiment of the present disclosure.
Figure 3:
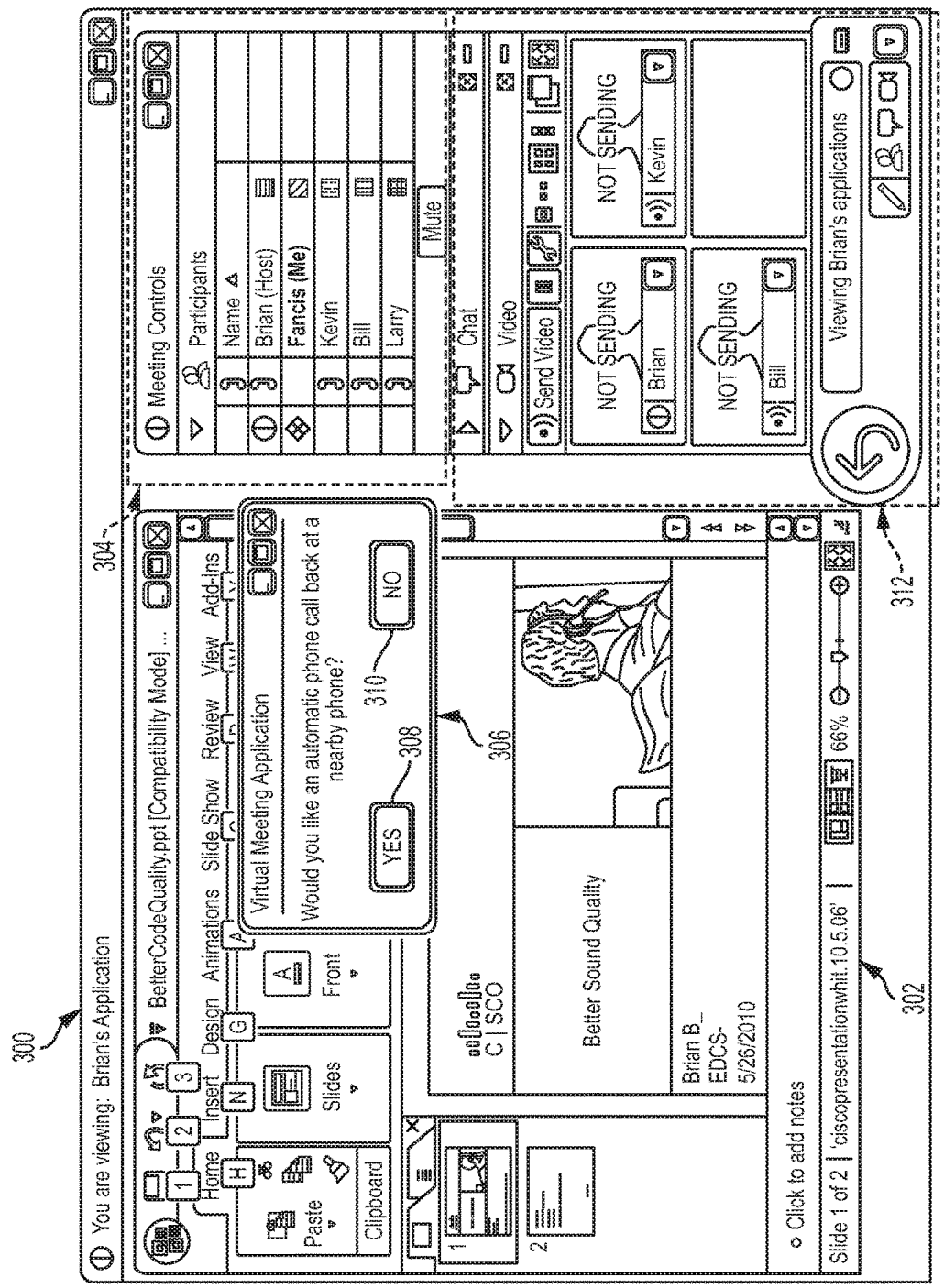
FIG. 3 is a simplified illustration of a user interface according to an embodiment of the present disclosure.

FIGS. 2-3 are simplified schematic diagrams illustrating example user interface graphics associated with one possible implementation of communication system 100. Turning specifically to FIG. 2, FIG. 2 is a simplified schematic diagram 200 associated with an example interface for conducting a virtual meeting using a virtual meeting application. This particular example relates to a virtual meeting initiation, specifically as the virtual meeting experience begins.

Semantically, the virtual meeting application is a client and server application. In some embodiments, the virtual meeting application may be a web-based application. A client module can be loaded onto an end user's endpoint via one or more webpages. A software module (e.g., a plug-in application, or a stand-alone application) can be delivered to a respective endpoint via the webpages. The software can be downloaded (or suitably updated) before participating in the meeting. If the software module is already resident on the end user's endpoint (e.g., previously downloaded, provisioned through any other type of medium (e.g., compact disk ("CD")), then while attempting to participate in a virtual meeting, that software module would be called to run locally on the endpoint. This allows a given endpoint to establish a communication with one or more servers (e.g., provisioned at data center meeting zone 140 and/or data center web zone 130).

Static data can be stored in data center web zone 130. For example, the scheduling data, the login information, the branding for a particular company, the schedule of the day's events, etc. can all be provided in data center web zone 130. Once the meeting has begun, any meeting experience information can be coordinated (and stored) in data center meeting zone 140. For example, if an individual were to share a document, or to pass the ball (i.e., pass control of the meeting), then that meeting experience would be managed by data center meeting zone 140. In a particular implementation, data center meeting zone 140 is configured to coordinate the gaze tracking and layout modification activities with endpoints 112*a*-*e* (e.g., via software modules). Details concerning that possible implementation are described below with reference to FIG. 5.

In order to initiate joining a virtual meeting, an endpoint may connect to any point of attachment. Hence, a client (e.g., a virtual meeting client) can perform appropriate operations to join a previously scheduled virtual meeting. The endpoint can be redirected to data center meeting zone 140 (as shown in FIG. 1). The meeting zone manager 148 can direct the endpoint to connect to a specific collaboration bridge server for joining the upcoming meeting. If the meeting has VoIP/video streams, then the endpoint also connects to a given server (e.g., an MCS) to receive those streams. The client is operably connected to the meeting (i.e., has completed joining the meeting) when client connected only by voice, only by video, or by integrated voice and video. Operationally, when the client joins the virtual meeting (e.g., and launches integrated voice and video) there are two connections being established to the collaboration bridge and to the MCS. For the collaboration bridge, one connection is established to send data and a second connection is established to receive data. For the MCS, one connection is established for control and the second connection is established for data. As the meeting begins, the meeting host may initially have control of the meeting (i.e., by default). The meeting is operational between the endpoint and other endpoint devices, which followed a similar initiation protocol to join the meeting.

FIG. 3 is a simplified schematic diagram 300 illustrating one example scenario in which a particular meeting participant is sharing a PowerPoint presentation during a virtual meeting. This participant can freely share his desktop such that other meeting participants can observe information that is resident on his local machine. In the example shown in FIG. 3, a user ("Francis"), has just joined a meeting hosted by Brian. Virtual meeting window 300 is an exemplary interface that is generated for display on an endpoint for Francis. Virtual meeting window 300 includes graphical representation of a communications data stream. The communications data stream includes any visual and/or audio data transmitted to (and received by) devices that are logged into a virtual meeting session. In this example, the communications data stream comprises presentation data 302, component 304, component 312, and user option window 306. The presentation data 302 corresponds to content displayed by a designated presenter within the meeting. Component 304 includes a list of participants that are currently logged into the virtual meeting. Component 312 includes communications data (e.g., video chat data, text chat data, or any other communication data, or graphical representations thereof, between users participating in the virtual meeting). User option window 306 includes user interface (UI) buttons 308 and 310 for confirming or denying, respectably, an option for an automatic call back at a phone (e.g., a phone detected by the user's device).

A meeting may have one or more designated presenters who share content in the meeting. In this case, there is only one presenter, Brian, who is also the meeting host. However, in other cases, the presenter is not the host and, instead, is a different participant in the meeting. Brian is sharing a slide show application including a presentation titled "Better Sound Quality" with other participants in the virtual meeting (as illustrated in presentation data 302). In other examples, presentation data 302 may be other types of documents (e.g., word processor, images, etc.), a desktop, or any other presentation content that is shared by a meeting participant. In one example, the presentation data 302 may be content uploaded by a user that is not the presenter. Presentation data is streamed to the participants that are logged into the virtual meeting session.

The list of users actively logged into the meeting is illustrated in user interface (UI) component 304. In this example, the list of users in the meeting is Brian, Francis, Kevin, Bill, and Larry. UI component 312 includes audio data, video data, chat data, or any other communication data (or graphical representation thereof) between the users participating in the virtual meeting. The video chat corresponds to communications between the users in the list of participant. In this case, the user (Francis) has just joined the meeting and is viewing Brian's shared application via presentation data 302.

When Francis joins the meeting, his device only receives the graphical data shown in window 300. His device does not receive any audio data from the meeting (though audio data is being generated by other users in the meeting) due, in part, to not being connected to the audio portion of the meeting (e.g., he has not placed a phone call into a meeting phone number that corresponds to the meeting). All of the other users have joined the audio portion of the conference call, as indicated by a telephone icon adjacent to the name of each of the other users. Because Francis is not yet connected to the audio portion, no telephone icon is adjacent to his name.

The connectivity manager module 150 generates an option 306, which provides an option for Francis (using his device) to join the audio portion of the meeting. Option 306 includes the message "Would you like an automatic call back at a nearby phone?" and provides input options of "YES" using UI button 308 and "NO" using UI bottom 310. If the user selects "NO" using UI bottom 310 (or by pressing the "X" in the upper-right corner of window 306), the system may prompt the user for manual input of a call-back number and/or may present a phone number associated with the virtual meeting for the user to call.

Figure 4:
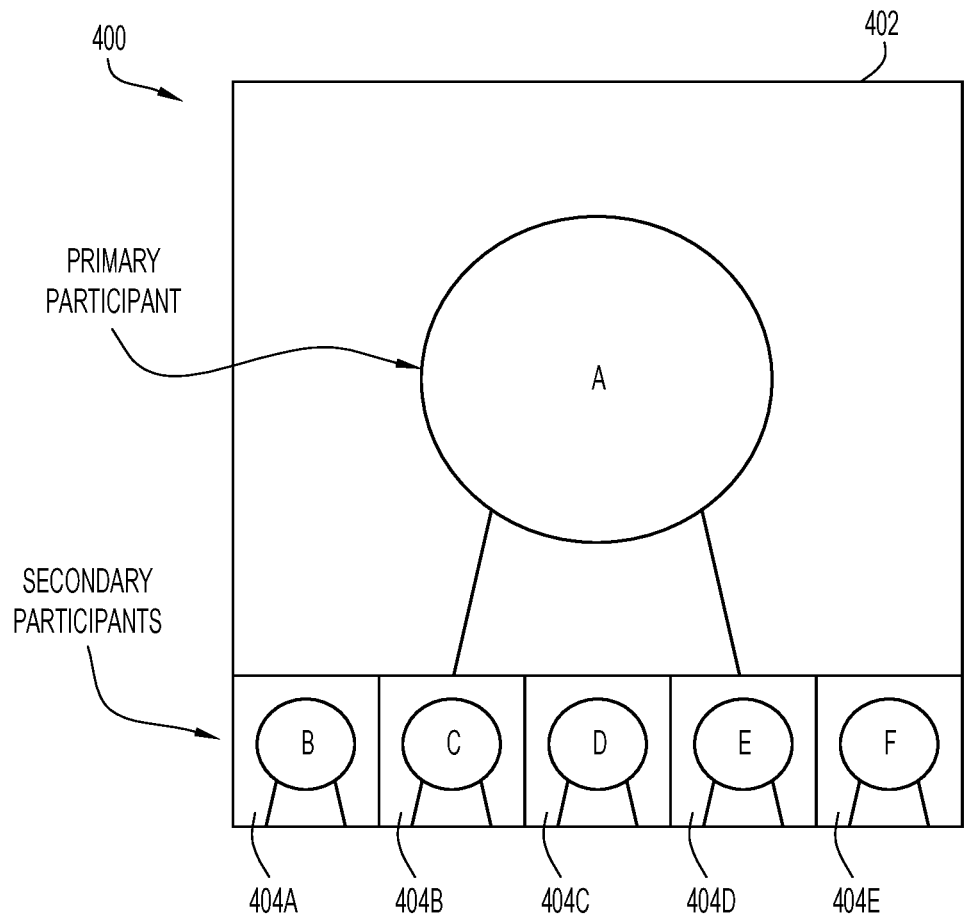
FIG. 4 is a simplified schematic diagram of an example multi-pane layout that may be used to present participants in a video conferencing session on the display of an endpoint utilized by a user to participate in the conferencing session in accordance with one embodiment.

FIG. 4 illustrates a simplified block diagram of an example multi-pane layout 400 that may be used to present participants in a video conferencing session on the display of an endpoint utilized by a user to participate in the conferencing session in accordance with embodiments described herein. As shown in FIG. 4, the layout 400 includes one large pane 402 displayed atop five smaller panes 404A-404E. A primary participant ("Participant A") is shown in the large pane 402, while secondary participants ("Participants B-F") are displayed in smaller panes 404A-404E, respectively. For purposes of example, it will be assumed that there are more than six other participants in the conference so that only a subset of the total number of participants consisting of six of participants may be displayed at any given time. In one embodiment, the current speaker will always be displayed in the large pane 402; however, an algorithm of some sort must be used to determine which of the non-speaking participations should be displayed in the smaller panes 404A-404E at any given time. For example, a very simple algorithm would result in the five most recent speakers being displayed in the smaller panes 404A-404E in order from most recent (pane 404A) to least recent (pane 404E).

In accordance with features of embodiments described herein, a measure of interest algorithm uses gaze tracking to determine a "measure of interest" of a user participating in a video conferencing session with respect to each of the other participants in the video conferencing session. The measure of interest assigned to each of the other participant vis-à-vis the user is used to determine whether to increase or decrease the likelihood that the participant will be displayed in one of the smaller panes 404A-404E (i.e., as a secondary participant) when they are not the primary participant (i.e., when they are not currently speaking).

Figure 5:
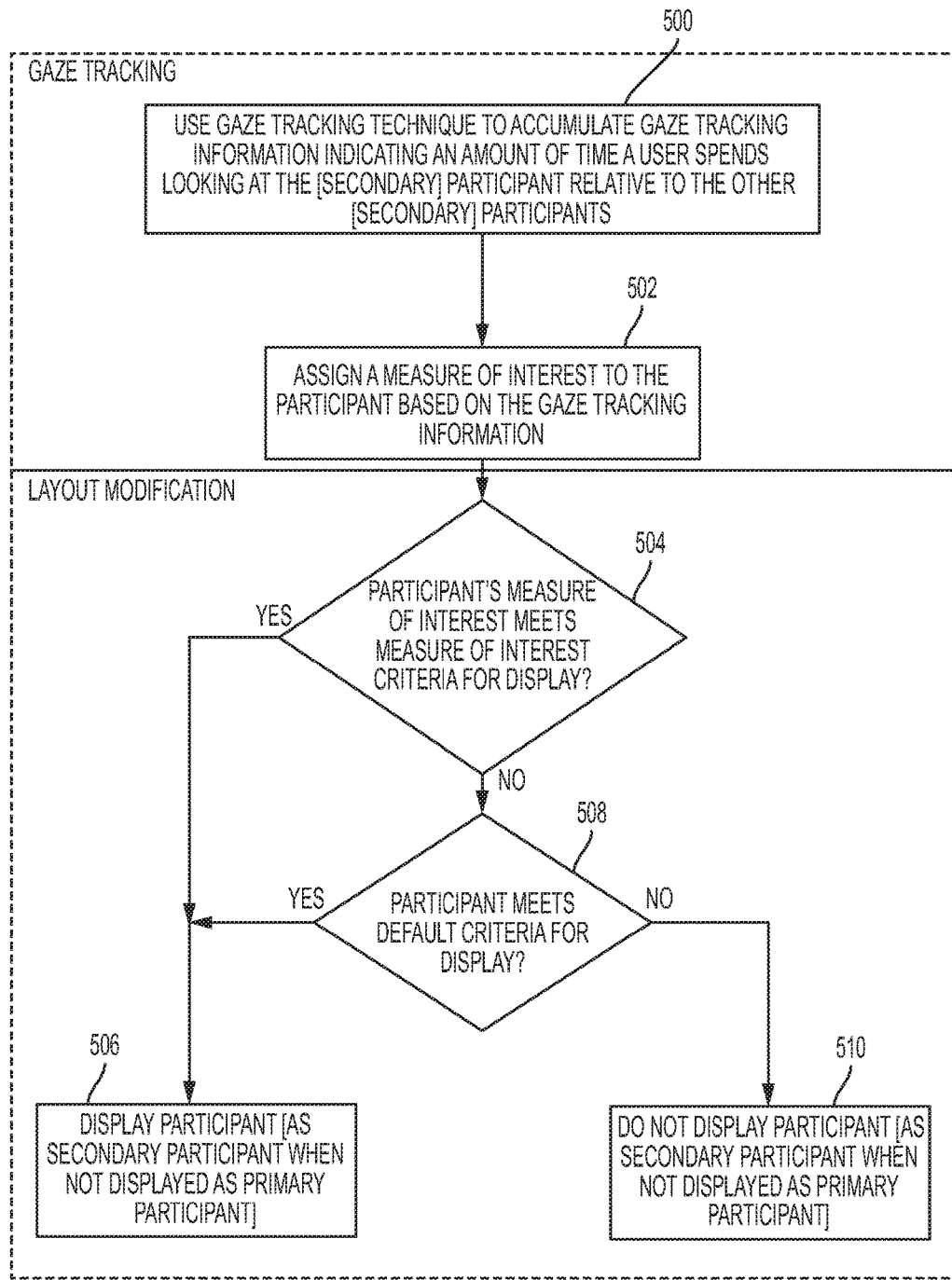
FIG. 5 is a flowchart illustrating steps that may be executed in a technique for participant selection bias for a video conferencing display layout based on gaze tracking in accordance with one embodiment.

Referring now to FIG. 5, illustrated therein is a flowchart showing steps that may be executed in a technique for participant selection bias for a video conferencing display layout based on gaze tracking in accordance with embodiments described herein. It will be recognized that one or more of the steps illustrated in FIG. 5 may be executed in connection with each participant in a video conferencing session. In certain embodiments, depending on the layout, one or more of the steps illustrated in FIG. 5 may be executed in connection with only those participants that are currently displayed as a secondary participant (i.e., non-speaking participants), as noted above with reference to FIG. 4. Additionally, one or more of the steps illustrated in FIG. 5 may be executed periodically (e.g., every 10 minutes) during a video conferencing session.

Referring again to FIG. 5, in step 500, a gaze tracking technique is used to accumulate gaze tracking information with respect to a participant. In particular, a gaze tracking technique is used to determine an amount of time the user is gazing at the participant relative to other participants. In certain embodiments, as noted above with reference to FIG. 4, the gaze tracking technique is used to determine an amount of time the user is gazing at the secondary participant relative to other secondary participants. It will be noted that any number of different gaze tracking techniques may be utilized to implement the embodiments described herein. Additionally, gaze tracking may be performed on the endpoint side or remotely on the conferencing server or an intermediate service that only calculates gaze based on the received video. Many cameras and camera-integrating devices, such as smartphones, already include gaze tracking in their Application Programming Interfaces ("APIs"). It will be noted that the gaze tracking technique used must be capable of determining at which participant in a multi-participant layout a user is looking at any given time. In layouts that display a limited number of participants on screen, this will likely not require a high level of accuracy and may allow the particular gaze tracking technique to be implemented cheaper or faster than might otherwise be the case.

In step 502, a measure of interest is assigned to the participant based on the gaze tracking information accumulated using the gaze tracking technique. In certain embodiments, the measure of interest may be a cumulative measure based on current and previous gaze tracking information gathered in connection with the participant. Gaze tracking is a point measurement at any given time and therefore must be averaged over a period of time to be of use. Because the participant(s) a user is interested in (i.e., looking at) may change over time, the period over which readings are averaged should ideally not extend back indefinitely but should be limited in time. Information used in assigning a measure of interest to a participant may therefore include a history for a given period of time for each participant of (1) gaze tracking information, (2) the participant present in each layout pane; and (3) which participant was speaking. A measure of interest i may then be generated for each participant, where i is calculated from the readings of the most recent 100 seconds of data during which (a) that participant was included in the layout but was not the active speaker and (b) the user was looking at a participant other than the active speaker. From these readings, i would be equal to the percentage of gaze readings in which the user was looking at the pane containing that participant. A high value for i would suggest that the user has a high level of interest in the participant.

Many more complex algorithms may be possible, such as assigning extra weight to readings that show a user choosing to look at a nonspeaking participant while another participant was actively speaking. Implementations may also determine that the experience improvise if the data for each layout is normalized. For example, analysis may show that for certain layouts, users tend to focus on a particular participant pane irrespective of the contents of the pane due simply to the position thereof (the center pane in a 3×3 grid layout, for example). In that case, the implementation may correct for this when converting the gaze tracking data to an interest measurement to get a more accurate determination of what the user was actually interested in. If such a correction factor is being applied, the factor could be applied statistically based on the collected data, with the final result being included in the code or retrieved from a server or it could be computed by the device dynamically bus storing all results for a given layout over time and using that data to calculate the bias for each layout. This could be performed in aggregate or potentially to produce a unique factor for each user on the device if the device is shared between multiple users and can differentiate between/among them.

For example, in one embodiment, a measure of interest may be assigned to a participant based on the following rule: Of the immediately preceding five minutes of gaze tracking, for the time period during which participant X was visible as a secondary participant and the user was looking at one of the secondary participants (i.e., not the primary participant, or speaker, in the embodiment illustrated in FIG. 4), for what percentage of time was the user looking at participant X? To illustrate this scenario, it will be assumed for the sake of example that during the immediately preceding five minutes, participant 5 was visible as a secondary participant the entirety of that time, the user was looking at one of the five secondary participants for a total of two minutes, and of those two minutes during which the user was looking at one of the five secondary participants, the user never looked at secondary participant 1, looked at participant 2 for a total of 10 seconds, looked at participant 3 for a total of 20 seconds, looked at participant 4 for a total of 30 seconds, and looked at participant 5 for a total of 60 seconds. Using the foregoing example, for the measurement time period, participant 1 may be assigned a measure of interest of 0, participant 2 may be assigned a measure of interest of y, participant 3 may be assigned a measure of interest of 2y, participant 4 may be assigned a measure of interest of 3y and participant 5 may be assigned a measure of interest of 6y.

Referring again to FIG. 5, in step 504, a determination is made whether the participant's measure of interest meets a measure of interest criteria established for display. If so, in step 506, the participant is displayed in the layout; otherwise, execution proceeds to step 508. In step 508, a determination is made whether the participant meets default criteria for display, such as being the most recent active speaker or one of the most recent active speakers. If so, execution proceeds to step 506, in which the participant is displayed in the layout; otherwise, execution proceeds to step 510, in which the participant is not displayed.

In general, once a measure of interest is calculated for each of the participants in the video conferencing session, the participants included in the layout may be altered based on that information (e.g., steps 504-510). For example, consider a layout such as that illustrated in FIG. 4. By default, the participant who is speaking or who spoke most recently (if no one is currently speaking) is shown in the pane 402, while the five secondary panes 404A-404E show the five participants who have most recently spoken. Any participant whose measure of interest i exceeds 0.3 is promoted to an "interested" layout category and is always displayed in one of the secondary panes 404A-404E if they are not speaking. The remaining panes are filled with the other most recent speakers as before. If the measure of interest for a particular participant falls below 0.15, that participant is removed from the "interested" layout category and not displayed in the layout unless they qualify as a recent speaker, for example. It will be recognized that there are many other different and/or more complex algorithms that could be implemented to determine which participants are displayed at any given time For example, rather than a binary pair of layout categories (e.g., "interested" and "not interested" or "primary" and "secondary"), an algorithm might instead increase the "stickiness" of a participant in the secondary set of panes so that rather than being removed when there were five more recent speakers, the participant remained until there were eight or none more recent speakers, with the stickiness increasing as the measure of interest of that particular participant increased.

It should be noted that, while the example display layout shown in FIG. 4 includes only a single primary participant pane, two or more such panes may be included, with a portion (e.g., the top) of the display being split among such primary participant panes, with such panes presumably being larger than the secondary participant frames (e.g., displayed along the bottom of the layout) so as to be easily distinguished therefrom. Additionally, the number of panes included in the display layout may be dynamic, such that the number of panes may be increased and decreased in accordance with the number of participants assigned to a particular layout category such that more/fewer such participants may be presented at a given time. The geometry of the display layout itself might even be modified based on the measure of interest of each of the participants. For example, a very high measure of interest in a particular participant for a persistent period might result in the layout being changed to one in which that participant were shown in an equal size to the active speaker (e.g., in a second "primary pane"). This might be done automatically or by prompting the user to indicate whether the user would like the change to be made. Alternatively, all of the participants may be initially displayed in equally-sized panes, with a participant being promoted to a "primary participant" category when the MOI of that participant exceeds a predetermined threshold value. It will be recognized that any number of alternatives to the layouts explicitly described herein may be implemented without departing from the spirit of the scope of the invention.

Figure 6A:
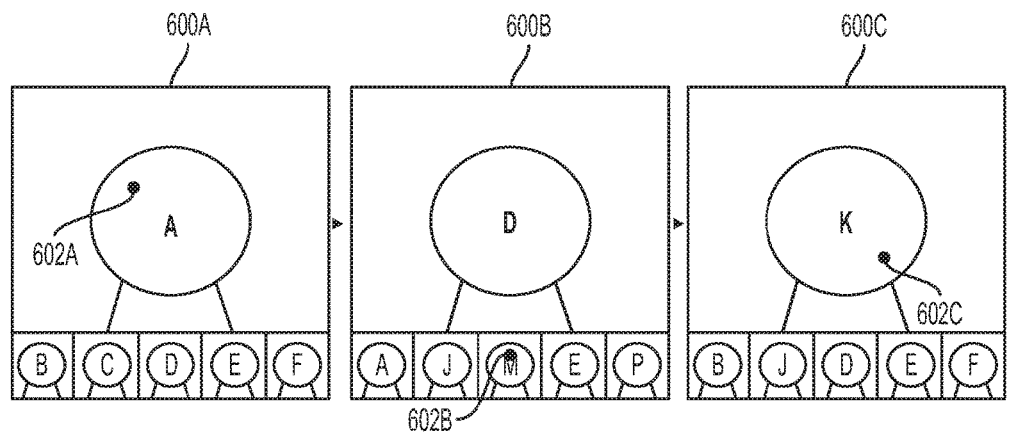
FIGS. 6A and 6B are simplified schematic diagrams of an example application of techniques for participant selection bias for a video conferencing display layout based on gaze tracking in accordance with one embodiment.

Referring now to FIG. 6A, illustrated therein are three snapshots over time, respectively designated by reference numerals 600A, 600B, and 600C, of a video conferencing session in which a user is participating. Dots 602A, 602B, and 602C indicate the user's gaze at the time of the snapshot as tracked by a gaze tracking module, such as GTLM module 155 (FIG. 1). Referring to FIG. 6A, in snapshot 600A, as indicated by dot 602A, the user is looking at participant A, as indicated by dot 602A, who at the time of the snapshot is the primary participant/speaker. In snapshot 600B, the user is looking at participant M, as indicated by dot 602B, who at the time of the snapshot is a secondary participant. In snapshot 600C, the user is looking at participant K, as indicated by dot 602B, who at the time of the snapshot is the primary participant/speaker. In accordance with features of embodiments described herein, the first and third snapshots 600A, 600C, may be ignored, as the user is looking at the primary speaker, as would be expected. However, in the second snapshot 600B, the user is looking at a secondary participant. As a result, this value is recorded and increases the measure of interest assigned to participant M. Additionally, in certain embodiments, the measure of interest assigned to participants H, J, E, and P, respectively, may be decreased due to the relative disinterest shown by the user. The measure of interest assigned to any participant who is not shown in the snapshot 600B is unaffected by the user's interest in participant M, since those users were not displayed.

Figure 6B:
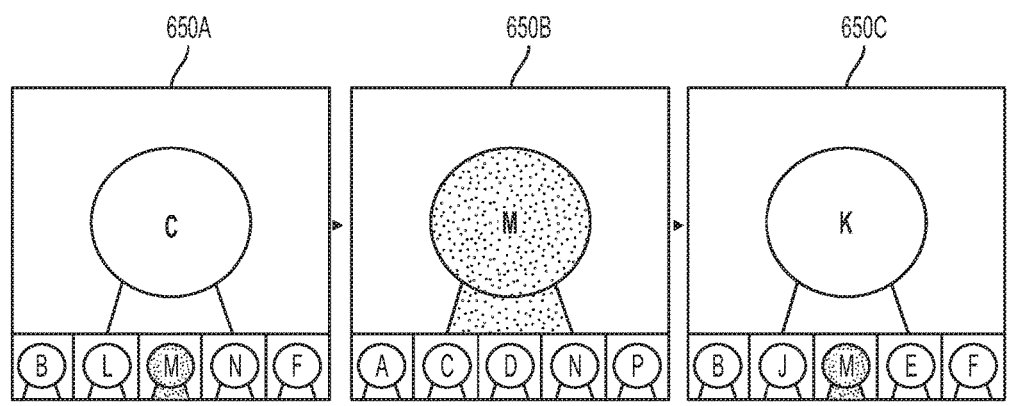

Referring now to FIG. 6B, it will be further assumed for the sake of example with respect to the example illustrated in FIG. 6A the layout may be updated based on the following rule: If any participant's measure of interest exceeds N, then that participant will always be displayed as a secondary participant if they are not displayed as the primary participant. FIG. 6B illustrates three snapshots 650A, 650B, 650C, later in time than, but during the same video conferencing session as, the snapshots 600A, 600B, 600C, of FIG. 6A. Referring to FIGS. 6A and 6B, it will be assumed for the sake of example that participant M's measure of interest is greater than N; therefore, participant M is displayed as a secondary user in snapshot 650A, as the primary participant (i.e., speaker) in snapshot 650B, and as a secondary user again in snapshot 650C. As no other participants meets the threshold measure of interest N, the other secondary participants displayed in each of the snapshots (e.g., participants B, L, N, and F, in snapshot 650A, participants A, C, D, N, and P, in snapshot 650B, and participants B, J, E, and F, in snapshot 650C) are selected using another rule, such as most recent speaker or a rolling selection, for example.

The embodiments described herein address cases in which the user's device can directly measure gaze, control the layout geometry, and select the participants appearing in the layout; however, they are equally applicable to systems in which some or all of that functionality is implemented elsewhere in the system. For example, in many video conferencing systems, such as that illustrated in FIG. 1, the layout may be selected by a MCU (or MCS) and then sent to the display of the user's device as a single video stream. In this case, the user's device could perform gaze tracking and pass the raw gaze data to the MCU using some method such as an out-of-band signaling channel or in a media-level channel negotiated in SIP. The MCU could then convert those values to measurements of interest and change the layout as appropriate. Alternatively, the MCU could signal which participant is present in which pane any time and the user device could determine the measurements of interest and simply signal the MCU about which participants should be placed in the "interested" layout category. Given a high resolution camera and only a need for limited accuracy, the gaze tracking could potentially be performed by the MCU itself.

In case in which the user is known and has persistent state associated with the user in the system, the system can make a user's measure of interest in participants persistent; that is, it can remember the overall measure of interest a user has shown in any given participant during a first video conferencing session, which measure of interest may be carried over to weigh the initial measure of interest in that participant in a subsequent video conferencing session.

In some architectures, participant selection for conference layouts may not be independent for each user; for example, an MCU may be encoding a single layout that is sent to all participants or the infrastructure may be distributed, in which case only a limited set of participant views are available for use at any given time due to limited bandwidth of those "cascade" links. In such scenarios, embodiments described herein may be implemented as follows. The gaze measurements or requests could be passed to the infrastructure, which could then aggregate them to create a set of measurements that may be applied to the shared layout that is available to all users. For example, if most users tended to pay more attention to one participant in a conference (e.g., the CEO), the layout decision logic implemented by the MCU could ensure that that participant was always visible.

Figure 7:
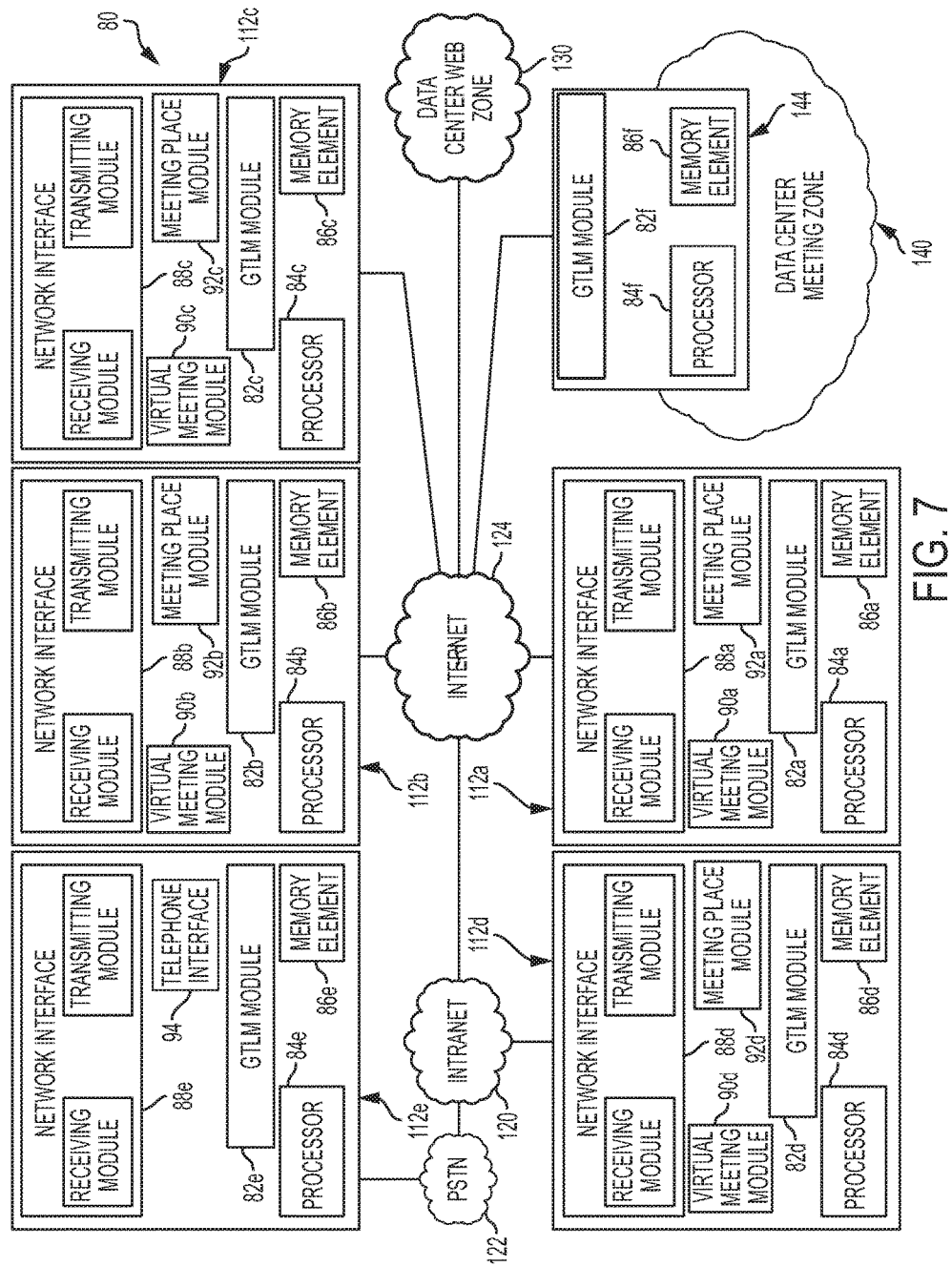
FIG. 7 is a simplified schematic diagram illustrating possible details related to an example infrastructure of the communication system in accordance with one embodiment.

FIG. 7 is a simplified block diagram illustrating one possible example of infrastructure associated with communication system 100. Each of endpoints 112a-e are provisioned with a respective GTLM module 82a-e, a respective processor 84a-e, a respective memory element 86a-e, a respective virtual meeting module 90a-e (e.g., a virtual meeting application), a respective Meeting Place module 92a-e, and a respective network interface 88a-e, which includes a respective receiving module and a respective transmitting module for exchanging data (e.g., for exchanging packets in a network environment). Endpoint 112e also includes a telephony module for communicating with telephony network 122. Additionally, FIG. 7 illustrates an example implementation of MCSs/MCC 144 that is similarly provisioned with a GTLM module 82f, a processor 84f, and a memory element 86f.

In one example implementation, each endpoint 112a-e and/or MCSs/MCC 144 includes software (e.g., as part of GTLM modules 82a-f) to achieve or to support the endpoint identification functions, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these endpoint identification operations.

It is imperative to note that FIG. 7 is indicative of just one, of the multitude, of example implementations of communication system 100. Any of the modules or elements within endpoints 112a-e and/or MCSs/MCC 144 may readily be replaced, substituted, or eliminated based on particular needs. Furthermore, although described with reference to particular scenarios, where a given module (e.g., virtual meeting modules 90a-e, Meeting Place modules 92a-e, GTLM modules 82a-f, etc.) is provided within endpoints 112a-e or MCSs/MCC 144, any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 112a-e are representative of any type of client or user wishing to participate in a meeting session in communication system 100 (e.g., or in any other online platform). Furthermore, endpoints 112*a-e* can be associated with individuals, clients, customers, or end users wishing to participate in a meeting session in communication system 100 via some network. The term 'endpoint' is inclusive of devices used to initiate a communication, such as a computer, a personal digital assistant (PDA), a laptop or electronic notebook, a cellular telephone of any kind, an iPhone, an IP phone, a Blackberry, a Google Droid, an iPad, a tablet, or any other device, component, element, or object capable of initiating voice, audio, video, media, and/or data exchanges within communication system 100. Endpoints 112*a-e* may also be inclusive of a suitable interface to the human user, such as a microphone, a display, or a keyboard or other terminal equipment. Endpoints 112*a-e* may also be any device that seeks to initiate a communication on behalf of another entity or element, such as a program, a proprietary conferencing device, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

MCSs/MCC 144 and web servers 132 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, load balancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 144 and web servers 132 are servers that can interact with each other via the networks of FIG. 1.

Intranet 120, telephony network 122, and Internet 124 represent a series of points or nodes of interconnected communication paths for receiving and transmitting packets of information that propagate through communication system 100. These networks may offer connectivity to any of the devices or endpoints of FIG. 1. Moreover, Intranet 120, telephony network 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, telephony network 122, and Internet 124 can support a transmission control protocol (TCP)/IP, or a user datagram protocol (UDP)/IP in particular embodiments of the present disclosure; however, Intranet 120, telephony network 122, and Internet 124 may alternatively implement any other suitable communication protocol for transmitting and receiving data packets within communication system 100. Note also that Intranet 120, telephony network 122, and Internet 124 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, Intranet 120, telephony network 122, and Internet 124 can foster all such communications and, further, be replaced by any suitable network components for facilitating the propagation of data between participants in a conferencing session.

It should also be noted that endpoints 112*a-e* and MCSs/ MCC 44 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with talking stick operations. In a general sense, the arrangement depicted in FIG. 7 may be more logical in its representations, whereas a physical architecture may include various permutations/combinations/hybrids of these elements.

Note that in certain example implementations, the endpoint identification functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 7) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 7) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, GTLM module 82*a-f* includes software in order to achieve the endpoint identification functions outlined herein, such as those illustrated in FIG. 5. These activities can be facilitated by MCSs/MCC 144 and/or the various endpoints 112*a-e*. MCSs/MCC 144 and/or endpoints 112*a-e* can include memory elements for storing information to be used in achieving the intelligent endpoint identification functions, as outlined herein. Additionally, MCSs/MCC 144 and/or endpoints 112*a-e* may include a processor that can execute software or an algorithm to perform the endpoint identification controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.'

Similarly, any of the potential processing elements, modules, and machines described in this Specification should be construed as being encompassed within the broad term 'processor.'

Embodiments described herein enable users to continue to use a particular telepresence product in precisely the manner to which they have become accustomed, but results in an improved experience without any action required on the part of the user. Unlike the aforementioned "pinning" of a secondary participant, embodiments described herein are executed automatically and require no action on the part of the user; in fact, it is anticipated that the effects will be transparent to the user. Rather, embodiments described herein accentuate and amplify the actions that a user is already taking; that is, paying particular attention to a participant. As a result, participants to which the user is paying particular attention automatically and transparently because more prominently featured in the video conferencing session and more often included in the layout, seamlessly improving utility without explicit action on the user's part.

Embodiments described herein also potentially allow for dynamic changing of the layout itself. In particular, by automatically changing or by prompting the user to do so when measurements of their interest suggest that they would like to do so, a user would experience a big increase in the utility of the feature.

In summary, embodiments described herein use gaze tracking to determine which non-speaking participants a user is paying particular attention to and then weights the selection algorithm to maximize the amount of time that participant and/or those participants are visible to the user. This ensures that each user ends up seeing the subset of participants that they are most interested in seeing. The technique can also help provide information to weight message prominence in cloud systems or the like.

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures. Additionally, although described with reference to particular scenarios where MCSs/MCC 144 resides in a particular physical location, MCSs/MCC 144 can reside in any location, provided it has some connectivity to a suitable network.

It is also important to note that the steps discussed with reference to FIGS. 1-7 illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in virtual meeting and Meeting Place conferencing environments or arrangements, the present disclosure may be used in any online environment that could benefit from such technology. For example, in certain instances, computers that are coupled to each other in some fashion can utilize the teachings of the present disclosure (e.g., even though participants would be in a face-to-face arrangement). The endpoint identification could still be respected by those meeting participants: even when they are physically co-located. Virtually any configuration that seeks to intelligently identify endpoint and connection users could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

Note that all optional features of the apparatus described above may also be implemented with respect to the method or process described herein and specifics in the examples may be used anywhere in one or more embodiments.

In accordance with the well-established principle that an "applicant is entitled to be his or her own lexicographer," MPEP 2111.01(IV), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

What is claimed is:

1. A method comprising:
   presenting to a user a display layout associated with a video conferencing session, the display layout comprising a plurality of images of participants in the video conferencing session, wherein each of the participants is assigned to a layout category, wherein the display layout comprises at least one primary pane and an M number of secondary panes in which the images are presented;
   accumulating gaze tracking information indicative of an amount of time the user has spent looking at the image of a first one of the participants relative to the images of other ones of the participants;
   assigning a measure of interest ("MOI") to the first one of the participants based on the accumulated gaze tracking information;
   determining whether the assigned MOI meets a first threshold value;
   if the assigned MOI meets the first threshold value, updating the layout category to which the first one of the participants is assigned; and
   updating the display layout using the updated layout category to which the first one of the participants is assigned, wherein each of the participants has an MOI associated therewith, the updating the display layout further comprising:
      presenting in the at least one primary pane an image of a current speaker in the video conferencing session;
      presenting in the secondary panes images of participants who are the most recent N speakers in the video conferencing session, where N<M, and (M-N) images of participants in the video conferencing session who have MOIs meeting the first threshold value and who are prior speakers and are not the most recent N speakers; and
      removing from the display layout an image of a participant in the video conferencing session who has an MOI that does not meet the first threshold value and who is not one of the most recent N speakers.

2. The method of claim 1, wherein at a given time, only one participant is categorized as a primary participant and each remaining participant is categorized as a secondary participant.

3. The method of claim 1, further comprising: if the first one of the participants is categorized as a secondary participant and the MOI meets the first threshold value, presenting the image of the first one of the participants in one of the secondary panes.

4. The method of claim 2, wherein a participant in the video conferencing session who is a current speaker is categorized as the primary participant and an image of the primary participant is presented in the at least one primary pane.

5. The method of claim 1, the updating the display layout further comprising presenting in the secondary panes images of participants categorized as secondary participants having assigned MOIs that meet the first threshold value.

6. The method of claim 1, the updating the display layout comprising, if the first one of the participants is categorized as a primary participant, displaying the image of the first one of the participants in the at least one primary pane.

7. The method of claim 1, wherein all of the images presented in the display layout are initially equally sized, the method further comprising:
   if the assigned MOI meets the first threshold value, categorizing the first one of the participants as a primary participant and the rest of the participants as secondary participants;
   wherein the updating the display layout comprises displaying the image of the first one of the participants such that the image of the first one of the participants is larger than the images of the remaining ones of the participants.

8. The method of claim 1, further comprising:
   if the assigned MOI of the first one of the participants falls below the first threshold value, determining whether the first one of the participants meets a default criterion; and if the first one of the participants fails to meet the default criterion, removing the image of the first one of the participants from the display layout.

9. One or more non-transitory tangible media that includes code for execution and when executed by a processor is operable to perform operations comprising:
   presenting to a user a display layout associated with a video conferencing session, the display layout comprising a plurality of images of participants in the video conferencing session, wherein each of the participants is assigned to a layout category, wherein the display layout comprises at least one primary pane and an M number of secondary panes in which the images are presented;
   accumulating gaze tracking information indicative of an amount of time the user has spent looking at the image of a first one of the participants relative to the images of other ones of the participants;
   assigning a measure of interest ("MOI") to the first one of the participants based on the accumulated gaze tracking information;
   determining whether the assigned MOI meets a first threshold value;
   if the assigned MOI meets the first threshold value, updating the layout category to which the first one of the participants is assigned; and
   updating the display layout using the updated layout category to which the first one of the participants is assigned, wherein each of the participants has an MOI associated therewith, the updating the display layout further comprising:
      presenting in the at least one primary pane an image of a current speaker in the video conferencing session;
      presenting in the secondary panes images of participants who are the most recent N speakers in the video conferencing session, where N<M, and (M-N) images of participants in the video conferencing session who have MOIs meeting the first threshold value and who are prior speakers and are not the most recent N speakers; and
      removing from the display layout an image of a participant in the video conferencing session who has an MOI that does not meet the first threshold value and who is not one of the most recent N speakers.

10. The media of claim 9, further comprising: if the first one of the participants is categorized as a secondary participant and the MOI meets the first threshold value, presenting the image of the first one of the participants in one of the secondary panes.

11. The media of claim 9, wherein a participant in the video conferencing session who is a current speaker is categorized as a primary participant and an image of the primary participant is presented in the at least one primary pane.

12. The media of claim 9, the updating the display layout further comprising presenting in the secondary panes images of participants categorized as secondary participants having assigned MOIs that meet the first threshold value.

13. The media of claim 9, wherein all of the images presented in the display layout are initially equally sized, the operations further comprising:
   if the assigned MOI meets the first threshold value, categorizing the first one of the participants as a primary participant and the rest of the participants as secondary participants;
   wherein the updating the display layout comprises displaying the image of the first one of the participants such that the image of the first one of the participants is larger than the images of the remaining ones of the participants.

14. The media of claim 9, wherein the operations further comprise:
   if the assigned MOI of the first one of the participants falls below the first threshold value, determining whether the first one of the participants meets a default criterion; and
   if the first one of the participants fails to meet the default criterion, removing the image of the first one of the participants from the display layout.

15. An apparatus comprising:
   a memory element configured to store data; and
   a processor operable to execute instructions associated with the data, wherein the processor is configured to:
      present to a user a display layout associated with a video conferencing session, the display layout comprising a plurality of images of participants in the video conferencing session, wherein each of the participants is assigned to a layout category, wherein the display layout comprises at least one primary pane and an M number of secondary panes in which the images are presented;
      accumulate gaze tracking information indicative of an amount of time the user has spent looking at the image of a first one of the participants relative to the images of other ones of the participants;
      assign a measure of interest ("MOI") to the first one of the participants based on the accumulated gaze tracking information;
      determine whether the assigned MOI meets a first threshold value;
      if the assigned MOI meets the first threshold value, update the layout category to which the first one of the participants is assigned; and
      update the display layout using the updated layout category to which the first one of the participants is assigned, wherein each of the participants has an MOI associated therewith, by:
         presenting in the at least one primary pane an image of a current speaker in the video conferencing session;
         presenting in the secondary panes images of participants who are the most recent N speakers in the video conferencing session, where N<M, and (M-N) images of participants in the video conferencing session who have MOIs meeting the first threshold value and who are prior speakers and are not the most recent N speakers; and
         removing from the display layout an image of a participant in the video conferencing session who has an MOI that does not meet the first threshold value and who is not one of the most recent N speakers.

16. The apparatus of claim 15, wherein if the first one of the participants is categorized as a secondary participant and the MOI meets the first threshold value, the processor is further configured to present the image of the first one of the participants in one of the secondary panes.

17. The apparatus of claim 15, wherein a participant in the video conferencing session who is a current speaker is categorized as a primary participant and the processor is further configured to present an image of the primary participant in the at least one primary pane.

18. The apparatus of claim 15, wherein the processor is further configured to present in the secondary panes images of participants categorized as secondary participants having assigned MOIs that meet the first threshold value.

19. The apparatus of claim 15, wherein all of the images presented in the display layout are initially equally sized, the processor further configured to:
- if the assigned MOI meets the first threshold value, categorize the first one of the participants as a primary participant and the rest of the participants as secondary participants;
- wherein the updating the display layout comprises displaying the image of the first one of the participants such that the image of the first one of the participants is larger than the images of the remaining ones of the participants.

20. The apparatus of claim 15, wherein the processor is further configured to:
- if the assigned MOI of the first one of the participants falls below the first threshold value, determine whether the first one of the participants meets a default criterion; and
- if the first one of the participants fails to meet the default criterion, remove the image of the first one of the participants from the display layout.

* * * * *